United States Patent [19]

Chyung et al.

[11] Patent Number: 4,808,460

[45] Date of Patent: Feb. 28, 1989

[54] LAMINATED STRUCTURES CONTAINING AN INORGANIC CORRUGATED OR HONEYCOMB MEMBER

[75] Inventors: Kenneth Chyung, Painted Post; Steven B. Dawes, Corning; Kishor P. Gadkaree, Big Flats; Robert M. Morena, Caton; Mark P. Taylor, Painted Post, all of N.Y.

[73] Assignee: Corning Glass Works, Corning, N.Y.

[21] Appl. No.: 57,531

[22] Filed: Jun. 2, 1987

[51] Int. Cl.⁴ .................................................. B32B 3/12
[52] U.S. Cl. ...................................... 428/116; 428/178; 428/182; 428/186; 428/312.6
[58] Field of Search .................. 428/116, 312.6, 312.8, 428/178, 182, 186

[56] References Cited

U.S. PATENT DOCUMENTS

| | | | |
|---|---|---|---|
| 3,112,184 | 11/1963 | Hollenbach | 428/116 X |
| 3,272,686 | 9/1966 | Smith et al. | 428/116 |
| 3,488,216 | 1/1970 | Martin | 428/428 R |
| 3,496,401 | 2/1970 | Dumbaugh, Jr. | 501/70 X |
| 3,554,929 | 1/1971 | Aarons | 428/116 X |
| 4,017,347 | 4/1977 | Cleveland | 428/178 X |
| 4,112,032 | 9/1978 | Blaszyk et al. | 264/45.3 X |
| 4,256,172 | 3/1981 | Rahnke et al. | 428/116 X |
| 4,442,175 | 4/1984 | Flannery et al. | 428/406 X |
| 4,455,382 | 6/1984 | Wu | 524/449 X |
| 4,464,475 | 8/1984 | Beall et al. | 501/8 X |
| 4,483,944 | 11/1984 | Day et al. | 502/439 |
| 4,615,987 | 10/1986 | Chyung et al. | 501/8 |
| 4,719,146 | 1/1988 | Hohage et al. | 428/331 |

*Primary Examiner*—Henry F. Epstein
*Attorney, Agent, or Firm*—Clinton S. Janes, Jr.

[57] ABSTRACT

This invention relates to the production of laminated structures consisting essentially of a light weight interior member prepared from a glass, glass-ceramic, or ceramic, an exterior member prepared from a glass, glass-ceramic, or ceramic, and a bonding member prepared from a glass, glass-ceramic, or ceramic. The light weight interior member may be composed of a porous body, a corrugated body, or a honeycomb body. In a preferred embodiment, at least one of said members is reinforced through the entrainment of ceramic fibers and/or whiskers. In the most preferred embodiment, each exterior and interior member is reinforced through the entrainment of ceramic fibers and/or whiskers and the bonding member is reinforced through the entrainment of ceramic whiskers.

11 Claims, No Drawings

LAMINATED STRUCTURES CONTAINING AN INORGANIC CORRUGATED OR HONEYCOMB MEMBER

BACKGROUND OF THE INVENTION

A laminated or sandwich-type structure containing a light weight interior member composed, e.g., of a porous body, such as a foam, or a corrugated or honeycomb member, has been adjudged to comprise the most appropriate configuration where light weight is of prime concern, but where the structure must also satisfy the required design and use constraints for a particular application. Typically, the sandwich-type structure will consist of an interior or core member composed of a porous body or having a corrugated or honeycomb geometry bonded between two exterior or face sheet members, the latter members commonly having flat surfaces. For example, organic or inorganic fiber reinforced epoxy or phenolic resins have been used as skin or face sheet members and rigid forms or foams prepared from such polymeric materials as polyurethane, polyvinyl chloride, epoxies, and phenolics have been employed as core elements. To illustrate, honeycomb and corrugated interior members have been fashioned from aluminum fiber and glass fiber reinforced plastics.

The use of organic materials as elements thereof self-evidently restricts the utility of such structures to relatively low temperature applications, commonly no higher than about 250° C. Therefore, the primary objective of the instant invention was to fabricate sandwich-type structures which would be light weight, exhibit values of high strength, high stiffness, and high toughness, and be capable of use at high temperatures.

SUMMARY OF THE INVENTION

That objective can be achieved through a laminated structure consisting essentially of three basic elements:

(a) a light weight interior member or core prepared from a glass, glass-ceramic, or ceramic, which member may be reinforced through the incorporation of glass, glass-ceramic, or ceramic fibers and/or whiskers; and (b) an exterior member, variously called a skin or face sheet, prepared from a glass, glass-ceramic, or ceramic, which member may be reinforced through the incorporation of glass, glass-ceramic, or ceramic fibers and/or whiskers; which are bonded together through (c) a glass frit which may be thermally crystallizable and which may be reinforced through the incorporation of glass, glass-ceramic, or ceramic whiskers.

The core member may comprise one layer or a plurality of layers of corrugated strips of material having juxtaposed support skin members bonded at the apices of the corrugations of each strip and disposed between adjacent strips to form a cellular structure; which cellular structure defines a plurality of hollow cavities extending through the core, each hollow cavity having an axis which may extend in a direction perpendicular to or parallel to the longitudinal axis of the laminated product.

In like manner, the core member may comrpise one or a plurality of honeycombs having juxtaposed support skin members bonded thereto and disposed between adjacent units.

Also in like manner, the core member may comprise one or a plurality of porous bodies having juxtaposed support or skin members bonded thereto and disposed between adjacent units. Such porous bodies may consist, e.g., of a glass, a glass-ceramic, or a ceramic.

In most instances the exterior or skin member will have a planar configuration, hence, a "face sheet". It will be appreciated that such a configuration is a matter of convenience only and not mandatory.

In broadest terms, the method for producing the inventive sandwich-type structures contemplates seven general steps:

(1) a light weight core element of a desired geometry and of a desired material is fashioned;

(2) a skin element of a desired material is formed;

(3) a glass frit of a desired composition is prepared;

(4) the glass frit is applied to a surface of the skin element (and, optionally, onto the upper surface of the core element);

(5) the frit-coated surface of the skin element is brought into contact with the core element to provide a laminated structure;

(6) the laminated structure is fired to a temperature sufficiently high to sinter the particles together, i.e., to cause the glass to flow (but not so high as to thermally deform the core of skin element), and thereby bond together the skin and core elements; and then (7) the bonded structure is cooled to room temperature (R.T.).

The bonding glass frit is prepared by comminuting glass of a desired composition to particles having diameters typically in the range of about 2–40 microns. Where desired, various ceramic fillers, e.g., zircon, aluminum titanate, mullite, and cordierite, may be included to vary the physical properties of the glass, e.g., the linear coefficient of thermal expansion thereof, and ceramic whiskers may be incorporated as reinforcement agents.

The glass particles and optional adjuvants (also in fine particulate form) are mixed into a vehicle system (customarily consisting of one or more organic liquids such as oils or other polymeric liquids). The resultant suspension is applied through such means as dipping, painting, and spraying, or in the form of a paste or as a frit-coated sheet. The last practice comprises depositing an organic suspension of particles onto a thin sheet of organic material, e.g., a polyester film, and drying. For example, the suspension will be continuously deposited onto a moving sheet as, for example, by doctor blading, and the resultant coated sheet cut into shapes of desired configurations and dimensions. Advantageously, the thickness of the particle layer on the sheet can be controlled quite accurately, the sheet applied to the precise location desired, and the frit will be spread uniformly over the bonding area. Nevertheless, because of the ease in application and the speed at which the suspension can be applied, spraying constitutes the preferred method of application.

Where the laminate contains several layers of bonding frit and/or where firing of the laminate is to be conducted in essentially non-oxidizing environments, e.g., neutral or reducing atmospheres, the laminate may, advantageously, be initially exposed to a temperature somewhat higher than about 250° C. for a period of time adequate to achieve complete removal of the organic materials prior to sintering the glass frit. To insure adequate glass flow with consequent formation of a good bond between the skin and core members, firing of the laminate will conveniently be carried out at temperatures at least about 100° C. above the softening point of the glass.

As can be recognized, the temperature capability of the inventive laminates is dependent upon the softening point of the bonding frit. Accordingly, for high temperature applications a thermally crystallizable glass is especially desirable. In such glasses not only will the crystal phase(s) generated in situ exhibit a melting point higher than the softening point of the original glass, but also the residual glassy phase will be small in volume and, customarily, will have a higher softening point than the parent glass. Most commonly, the crystallization in situ of the glass takes place immediately following the sintering of the glass particles during the firing step.

For applications where the highest exposure temperature will not exceed about 500° C., simple glass skins and/or cores may be employed. Whereas borosilicate glass compositions can be operable, the more refractory aluminosilicate glasses have been preferred. The alkaline earth aluminosilicate glasses disclosed in U.S. Pat. No. 3,496,401 have been found particularly desirable. Those glasses consist essentially, expressed in terms of weight percent on the oxide basis, of

| $SiO_2$ | 55–70 | Alkaline earth oxide | 10–25 |
|---|---|---|---|
| $Al_2O_3$ | 13–25 | $B_2O_3$ | 0–10 |

Furthermore, to enhance the mechanical strength and toughness of the glass components, ceramic fibers and/or whiskers such as graphite, mullite, spinel, zircon, $Al_2O_3$, BN, $B_4C$, SiC, $Si_3N_4$, and $ZrO_2$ may be incorporated therein to provide reinforced composite bodies. U.S. Pat. No. 4,626,515 describes the preparation of composite bodies consisting essentially of an alkali metal-free, alkaline earth aluminosilicate glass matrix containing both about 5–60% by weight SiC whiskers and about 15–70% by volume ceramic fibers, the total content of whiskers and fibers not exceeding about 70% by weight. Those composites are greatly preferred for glass members comprising the skin and/or core elements of the inventive laminated structures. The patent notes the special utility of Corning Code 1723, an alkaline earth aluminosilicate glass marketed by Corning Glass Works, Corning, N.Y., as the matrix glass. That glass, falling within the scope of U.S. Pat. No. 3,496,401, supra, has the following approximate composition, expressed in terms of weight percent on the oxide basis, of

| $SiO_2$ | 57 | CaO | 10 |
|---|---|---|---|
| $Al_2O_3$ | 16 | MgO | 7 |
| BaO | 6 | $B_2O_3$ | 4 |

Corning code 1723 has a softening point of about 903° C., an annealing point of about 710° C., and a strain point of about 665° C. It will be recalled, however, that the bonding glass frit must have an annealing point at least about 100° C. below the annealing point of Corning Code 1723, when that glass constitutes the skin and/or core element of the laminated structure, in order to avoid thermal deformation thereof as the bonding frit is being fused. It logically follows, then, that the temperature to which the laminated structure is operable is governed by the annealing point of the bonding glass frit. Hence, when the laminated structure is subjected to temperatures above the annealing point of the bonding glass frit, movement (substantial flow at very high temperatures) will occur in the bonding glass giving rise to thermal deformation of the laminated structure. Thus, where a laminated structure consisting of a simple glass skin and/or core member is to be exposed for extended periods at elevated temperatures, 500° C. has been suggested as a practical and safe maximum.

It will be appreciated, however, that the inclusion of ceramic fibers and/or whiskers to enhance the mechanical strength and toughness of glass components can, at the same time, raise the temperature at which the glass will deform and flow. Accordingly, where an alkali metal-free alkaline earth aluminosilicate glass strongly reinforced with ceramic fibers and/or whiskers is employed, laminated structures prepared therefrom may be used in applications up to about 700° C.

As was indicated previously, the most refractory sandwich-type structures utilize ceramic and/or glass-ceramic skin and core elements with a thermally-crystallizable glass comprising the bonding glass frit element. It will be appreciated that the linear coefficients of thermal expansion of the three members must be quite close to insure sound bonding therebetween. Accordingly, inasmuch as the coefficient of thermal expansion of a glass-ceramic can be modified relatively easily through changes in composition and/or heat treatment, the preferred practice contemplates the use of a glass-ceramic as a skin and/or core member. In the most preferred practice, the bonding frit will have essentially the same base composition as that of the glass-ceramic skin and/or core member such that, upon sintering to provide a bond between the skin and core members, the glass crystallizes in situ to form the same crystal phase(s) present in the glass-ceramic. As a result of that practice, the linear coefficients of thermal expansion of the crystallized bonding frit and of the glass-ceramic element(s) will be virtually identical.

Although glass-ceramic bodies wherein an alkali metal oxide-containing crystal, such as $\beta$-eucryptite solid solution, $\beta$-quartz solid solution, $\beta$-spodumene solid solution, and nepheline, constitutes the predominant crystal phase can comprise the skin and core members, bodies exhibiting higher refractoriness are obtainable where an alkaline earth metal oxide-containing crystal, such as cordierite, Ba-osumilite, celsian, and anorthite, constitutes the predominant crystal phase. Such more highly refractory bodies comprise the preferred embodiment of the inventive laminated structures, with glass-ceramics containing Ba-osumilite, celsian, or anorthite as the predominant crystal phase constituting the most preferred embodiment.

Ba-osumilite-containing glass-ceramic bodies are explicitly disclosed in U.S. Pat. No. 4,464,475. Those bodies, which are observed as being useful as matrices for ceramic fiber reinforced structures, consist essentially, expressed in terms of weight percent on the oxide basis, of:

| $SiO_2$ | 51–68 | BaO | 3.5–15 | $Ta_2O_5$ | 0–10 |
|---|---|---|---|---|---|
| $Al_2O_3$ | 17.5–30 | Si | 0–1 | $TiO_2$ | 0–12 |
| MgO | 5–12 | $Nb_2O_5$ | 0–20 | $ZrO_2$ | 0–6 |

U.S. Pat. No. 4,615,987 discloses glass-ceramic bodies in the alkaline earth aluminosilicate system wherein the predominant crystal phase is selected from the group of anorthite and its pseudo-binaries with mullite, cordierite, Ba-osumilite, albite solid solution, $Al_2O_3$, $SiO_2$, $CaO.SiO_2$, and gehlenite. The bodies are explicityl described as being useful as matrices for ceramic fiber and/or whisker reinforced structures and consist essentially, expressed in terms of weight percent on the oxide basis, of:

| | | | |
|---|---|---|---|
| CaO | 0–25 | MgO | 0–15 |
| SrO | 0–30 | Na$_2$O | 0–4 |
| CaO + SrO | 10–30 | K$_2$O | 0–6 |
| Al$_2$O$_3$ | 25–38 | TiO$_2$ | 0–12 |
| SiO$_2$ | 35–60 | ZrO$_2$ | 0–15 |
| BaO | 0–25 | As$_2$O$_3$ | 0–3 |
| | | BaO + MgO + Na$_2$O + K$_2$O + TiO$_2$ + As$_2$O$_3$ | 0–30 |

U.S. patent application Ser. No. 943,072, filed Dec. 18, 1986 in the names of Kenneth Chyung, Kishor P. Gadkaree, Ronald L. Stewart, and Mark P. Taylor under the tital Reinforced Calcium Aluminosilicate Glass-Ceramics, also discloses glass-ceramic bodies in the alkaline earth aluminosilicate system suitable as matrices for ceramic fiber and/or whisker reinforced structures, but which exhibit higher refractoriness than the glass-ceramics of U.S. Pat. No. 4,615,987. These inventive glass-ceramics consist essentially, expressed in terms of weight percent on the oxide basis, of 16–20% CaO, 38.5–46% Al$_2$O$_3$, 35–42% SiO$_2$, and up to 10% total of at least one nucleating agent in the indicated proportion selected from the group of 0.1–3% Cr$_2$O$_3$, 0.25–3% HfO$_2$, 2–5% MoO$_3$, 0.25–3% Nb$_2$O$_5$, 0.25–3% Ta$_2$O$_5$, 0.25–3% WO$_3$, and 1–10% ZrO$_2$, wherein Al$_2$O$_3$ is present in an amount which is at least 5 mole percent and up to 50 mole percent in excess of that present in stoichiometric anorthite. The predominant crystal phases are anorthite and mullite and/or α-Al$_2$O$_3$.

DESCRIPTION OF PREFERRED EMBODIMENTS

Table I records several thermally crystallizable glass compositions especially suitable for use in the present invention, expressed in terms of parts by weight on the oxide basis. Example 1 crystallizes in situ to yield Ba-osumilite as the predominant crystal phase in accordance with U.S. Pat. No. 4,464,475. Examples 2–6 crystallize in situ to yield anorthite as the predominant crystal phase with a minor amount of cordierite in accordance with U.S. Pat. No. 4,615,987. Examples 7 and 8 crystallize in situ to produce anorthite and mullite as the predominant crystal phases in accordance with U.S. patent application Ser. No. 943,072. Example 9 crystallizes in situ to provide celsian (BaO.Al$_2$O$_3$.2SiO$_2$) as the principal phase with significant contents of sanidine (K$_2$O.Al$_2$O$_3$.SiO$_2$), and Examples 10 and 11 crystallizee in situ to yield cordierite as the predominant phase with a minor concentration of anorthite. Example 12 crystallizes in situ to anorthite and a minor amount of mullie with some B$_2$O$_3$-rich residual glass which promotes flow of the frit. Inasmuch as the sum of the individual components of each composition closely approximates 100, for all practical purposes the values reported can be deemed to represent weight percent. The actual batch ingredients for the glasses may comprise any materials, either an oxide or other compound, which, when melted together with the remainder of the batch, will be converted into the desired oxide in the proper proportions. For example, CaCO$_3$ can furnish the source of CaO.

In the laboratory activity described hereinbelow, the batch ingredients were compounded, ballmilled together to assist in obtaining a homogeneous melt, and the mixture charged into platinum crucibles. After covering, the crucibles were introduced into a furnace operating at about 1650° C. and the batches melted for about 16 hours without stirring. A portion of each melt was poured onto a steel plate to form a generally circular slab which was transferred immediately to an annealer. The second portion of each melt was poured as a relatively fine stream into a container of water to yield finely-divided particles of glass, a practice termed in the glass art "drigaging." The glass particles were dried and comminuted to particles having an average size less than 10 microns. To insure the absence of any tramp large particles, the material was passed through a No. 100 United States Standard Sieve (149 microns).

TABLE I

| | 1 | 2 | 3 | 4 | 5 | 6 |
|---|---|---|---|---|---|---|
| SiO$_2$ | 53.14 | 44.8 | 44.0 | 45.6 | 46.4 | 47.2 |
| Al$_2$O$_3$ | 24.93 | 36.3 | 36.5 | 36.2 | 36.0 | 35.8 |
| MgO | 8.44 | 2.8 | 1.4 | 4.1 | 5.5 | 6.9 |
| BaO | 12.48 | — | — | — | — | — |
| As$_2$O$_3$ | 1.0 | 0.5 | 0.5 | 0.5 | 0.5 | 0.5 |
| CaO | — | 16.1 | 18.2 | 14.1 | 12.1 | 10.1 |

| | 7 | 8 | 9 | 10 | 11 | 12 |
|---|---|---|---|---|---|---|
| SiO$_2$ | 39.5 | 39.5 | 43.1 | 48.1 | 48.9 | 37.4 |
| Al$_2$O$_3$ | 38.5 | 38.5 | 22.8 | 35.6 | 35.4 | 36.3 |
| MgO | — | — | — | 8.3 | 9.7 | — |
| BaO | — | — | 24.0 | — | — | — |
| As$_2$O$_3$ | 0.5 | 1.0 | 0.75 | 0.5 | 0.5 | 0.5 |
| CaO | 18.4 | 18.4 | — | 8.1 | 6.1 | 17.4 |
| ZrO$_2$ | 3.0 | 3.0 | 3.0 | — | — | 2.8 |
| K$_2$O | — | — | 6.33 | — | — | — |
| B$_2$O$_3$ | — | — | — | — | — | 5.7 |

In the following set of ten examples, powders (frits) of Examples 1, 2, 7, and 8 were utilized to bond SiC fiber reinforced glass-ceramic skins to a variety of ceramic and glass-ceramic honeycombs, thereby forming strengthened sandwich-type structures. The bonding frits were applied as a paste, by spraying, or as a tape cast sheet.

Two paste recipes were employed. The first comprised a slurry consisting, in weight percent, of 73.5% frit and 26.5% extender, the latter component being No. 324 pine screen oil or No. 175 Squeegee Oil marketed by Drakenfeld Color Company, Washington, Pa. The second comprised a slurry consisting, in weight percent, of 69% frit and 31% ethylene glycol. A thin coating ($\approx$1 mm thickness) of the paste was applied to a surface of the skin member using a spatula.

Slips for spraying were prepared by adding isopropanol to either of the frit pastes (15 ml isopropanol to 34 grams of pine screen oil-based paste and 11 ml isopropanol to 36.25 grams of ethylene glycol-based paste). The resulting slips were mixed with a magnetic stirring bar for about one hour and then sprayed onto a surface of a skin member using a standard air gun at a gauge pressure of 30 psi.

Preparation of frit sheet (0.003–0.005" thickness) suitable for tape casting involved the following steps:

(1) 500 grams of powdered glass or glass-ceramic (along with any reinforcing or toughening agents such as ceramic whiskers), 333 grams of TAM ceramic binder 73210 marketed by Metoramic Sciences, Inc., Carlsbad, Calif., and 20.9 grams of Emphos PS-21A surfactant, marketed by Witco Chemical Corporation, New York, N.Y., were charged into a cylindrical plastic container and ballmilled on a roller mill for 12–16 hours utilizing alumina balls;

(2) the alumina balls were withdrawn from the container and the suspension allowed to de-aerate by roller milling for an additional 12-16 hours;

(3) the suspension was then cast onto a silicone-coated polyester carrier film of about 0.002" ($\approx$ 50 microns) thickness utilizing a double-edge doctor blade having dimensions of about 6" width and 0.025" thickness; and (4) after air drying, the coated film was cut into desired lengths and the coating peeled away from the carrier film, resulting in frit sheeting or tape.

It was found to be advantageous to apply a thin coating of screen oil on both surfaces of the frit tape in order to promote adherence of the frit to both the skin and the honeycomb prior to the sintering firing.

Additions of SiC whiskers and particles of partially-stabilized $ZrO_2$ at the 10% by weight level were made to the bonding frits and SiC whiskers at the 20% by weight level were made to honeycombs as reinforcing agents. Such additions were made following the steps below:

(a) To 250 ml distilled water and 750 ml isopropanol were added 5 grams of SiC whiskers or partially-stabilized $ZrO_2$ particles and 45 grams of the frit, and the mixture then ballmilled for 30 minutes to deagglomerate the whiskers and produce a uniform suspension. The SiC whiskers employed had diameters of about 1 micron or somewhat less and lengths of about 40-50 microns. The $ZrO_2$ particles had dimensions of less than 10 microns.

(b) The suspension was vacuum filtered.

(c) The resulting filter cake was dried.

A 10% be weight addition of Corning 1723 glass was made to the $ZrO_2$-containing frit to offset the reduction in the overall linear coefficient of thermal expansion caused by the incorporation of the $ZrO_2$. Corning 1723 glass exhibits a linear coefficient of thermal expansion of about $46 \times 10^{-7}$/C. In the crystallized state, Example 1 exhibits a linear coefficient of thermal expansion of about $25 \times 10^{-7}$/C., Example 2 exhibits a linear coefficient of thermal expansion of about $43 \times 10^{-7}$/C., and Example 7 exhibits a linear coefficient of thermal expansion of about $50 \times 10^{-7}$/C.

Pastes of $ZrO_2$-containing frits and pastes and spray slips of SiC whisker-containing frits were prepared using the recipes recorded above. No changes were required in firing practice for laminated structures bonded by the modified frits.

Regardless of the application technique employed in coating a surface of a skin member with the bonding frit, the honeycomb was pressed into the coating by hand pressure. No preliminary drying operation was performed. Good bonding of the sandwich-type structure was generally achieved after firing in air in the range of about 1150° C.-1250° C. for periods of time up to three hours at maximum temperature. A typical operable firing schedule consisted of raising the temperature from R.T. to 875° C. at a rate of about 300° C./hour, optionally holding that temperature for one hour, raising the temperature to 1250° C. at a rate of about 200° C./hour, maintaining that temperature for three hours, and then cooling to room temperature at a rate of about 150° C./hour. Firing can also be carried out in essentially non-oxidizing atmospheres such as nitrogen or helium, and in a vacuum.

The test specimens employed consisted of up to 2"×2"×1" squares of honeycomb. In each instance the skin member consisted of a glass-ceramic reinforced with SiC fibers in the amount of 35-40% by volume. Grinding the surface of the skin member to promote surface roughness prior to applying the bnding frit appeared to have a beneficial effect with respect to the strength of the bonding that was achieved in the laminated structures.

Table II reports laboratory work conducted on honeycombs of five different compositions. Honeycomb A consisted of a sintered ceramic containing cordierite and mullite as the principal phases which is marketed by Corning Glass Works under the designation corning 9480. Honeycomb B consisted of a sintered ceramic containing aluminum titanate and mullite as the principal phases which has a composition within the scope of U.S. Pat. No. 4,483,944. Honeycomb C consisted of a sintered ceramic containing cordierite as the principal phase which has a composition within the scope of U.S. Pat. No. 3,885,977. Honeycomb D consisted of a body of sintered zircon. Honeycomb E consisted of a glass-ceramic body having the composition of Example 7 in Table I reinforced through the inclusion of 20% by weight SiC whiskers.

In Table II, the designation "poor" under the legend "Bond" signifies that the structure separated, usually at the bonding frit-skin interface, either spontaneously during cooling or subsequently upon the application of mild hand pressure.

TABLE II

| Bonding Frit | Skin | Honeycomb | Bond |
|---|---|---|---|
| *Example I* | | | |
| Example 1 (pine oil paste) | SiC fiber/Example 1 | Example A | Good |
| Example 1 (pine oil paste) | SiC fiber/Example 1 | Example B | Good |
| Example 1 (pine oil paste) | SiC fiber/Example 1 | Example C | Poor |
| *Example II* | | | |
| Example 7 (pine oil paste) | SiC fiber/Example 1 | Example A | Good |
| Example 7 (pine oil paste) | SiC fiber/Example 1 | Example B | Good |
| Example 7 (pine oil paste) | SiC fiber/Example 1 | Example C | Poor |
| *Example III* | | | |
| Example 7 (pine oil paste) | SiC fiber/Example 7 | Example A | Poor |
| Example 7 (pine oil paste) | SiC fiber/Example 7 | Example B | Poor |
| Example 7 (pine oil paste) | SiC fiber/Example 7 | Example C | Poor |
| Example 7 (pine oil paste) | SiC fiber/Example 7 | Example D | Good |
| Example 7 (pine oil paste) | SiC fiber/Example 7 | Example E | Good |
| *Example IV* | | | |
| SiC whiskers/Example 7 (pine oil paste) | SiC fiber/Example 7 | Example D | Good |
| SiC whiskers/Example 7 (pine oil paste) | SiC fiber/Example 7 | Example E | Good |
| *Example V* | | | |
| SiC whiskers/Example 7 (pine oil spray) | SiC fiber/Example 7 | Example E | Good |
| SiC whiskers/Example 7 (glycol spray) | SiC fiber/Example 7 | Example E | Good |
| *Example VI* | | | |
| $ZrO_2$ + 1723/Example 7 (pine oil paste) | SiC fiber/Example 7 | Example D | Good |
| $ZrO_2$ + 1723/Example 7 | SiC fiber/Example 7 | Example E | Good |

TABLE II-continued

| Bonding Frit | Skin | Honeycomb | Bond |
|---|---|---|---|
| (pine oil paste) | | | |
| ZrO$_2$ + 1723/ Example 7 | SiC fiber/Example 7 | Example D | Good |
| (glycol paste) | | | |
| ZrO$_2$ + 1723/ Example 7 | SiC fiber/Example 7 | Example E | Good |
| (glycol paste) | | | |
| Example VII | | | |
| Example 7 (tape cast) | SiC fiber/Example 7 | Example D | Good |
| Example VIII | | | |
| SiC whiskers/ Example 7 (tape cast) | SiC fiber/Example 7 | Example D | Good |
| Example IX | | | |
| 50/50 Example 2/ Example 7 | | | |
| (pine oil paste) | SiC fiber/Example 7 | Example E | Good |
| (glycol paste) | SiC fiber/Example 7 | Example E | Good |
| (pine oil spray) | SiC fiber/Example 7 | Example E | Good |
| (glycol spray) | SiC fiber/Example 7 | Example E | Good |
| Example IX | | | |
| Example 9 | SiC fiber/Example 8 | Example E | Good |

The above laboratory work indicated three vital parameters involved in achieving good bonding between the members of the structure:

(1) thermal expansion compatibility between the skin and core elements;

(2) the sintering and flow characteristics of the bonding frit; and (3) the simultaneous or subsequent crystallization behavior of the frit.

The criticality of securing minimal thermal expansion mismatch infrit-bonded, fiber reinforced structures was especially evident in structures composed of a SiC fiber reinforced Example 7 glass-ceramic skin and a SiC whisker reinforced Example 7 glass-ceramic honeycomb. The linear coefficient of thermal expansion (25°–1000° C.) of SiC fiber reinforced Example 7 glass-ceramic is about $47 \times 10^{-7}/°C$. and that of SiC whisker reinforced Example 7 glass ceramic is about $48 \times 10^{-7}/°C$. For example, where bonding of those two members was attempted employing Example 2 frit, which has a linear coefficient of thermal expansion in the glass-ceramic state of about $43 \times 10^{-7}/°C$., the structures generally failed during the cooling stage of the firing process. Again, where bonding of those two members was attempted employing Example 7 frit, which has a linear coefficient of thermal expansion in the glass-ceramic state of about $50 \times 10^{-7}/°C$., the structures usually survived the firing process, but frequently exhibited crazing cracks. A 50/50 blend (equal proportions on a weight basis) of the Example 2 and Example 7 bonding frits (calculated linear coefficient of thermal expansion of $46.5 \times 10^{-7}/°C$.) produced well-bonded structures evidencing no sign of crazing. Hence, the physical mixing of frits having high and low coefficients of thermal expansion permits custom matching of the bonding frit to skin and core members of various compositions.

The other significant parameter, viz., the sintering and flow characteristics of the bonding frit, can be expressed as the temperature interval between the onset of viscous flow ($T_g$ or glass transformation temperature) and the beginning of widespread crystallization ($T_{Cryst}$). Each of Examples 1, 2, and 7 has a relatively wide $T_{Cryst}$–$T_g$ range; differential thermal analyses indicating a value for that range of about 100°–150° C. The actual data are recorded below:

| Example | $T_g$ | $T_{Cryst.}$ |
|---|---|---|
| 1 | 940° C. | 1040° C. |
| 2 | 855° C. | 975° C. |
| 7 | 860° C. | 990° C. |

Because the above frits are high temperature glass-ceramics, rather than a traditional solder glass, the use temperatures thereof are extended to levels comparable to those of the skin and core elements. The capability of applying the bonding frits through spraying is a very valuable attribute inasmuch as it enables the production of very uniform and thin coatings. Such capability makes possible close control of frit thickness and may make possible both erosion resistant and oxidation resistant coatings for fiber reinforced composite structures.

The illustrative examples described above were directed to the fabrication of sandwich-type composites wherein a honeycomb structure served as the interior or core member. Further reduction in overall mass of such composites can be secured, however, through the use of a low density material as the core member. Hence, by applying the above-defined bonding principles, it is possible to bond a lightweight, porous glass, glass-ceramic, or ceramic core member to a glass, glass-ceramic, or ceramic skin member.

One especially useful type of porous body is described in U.S. Pat. No. 4,442,175. That patent discloses cellular ceramic bodies having micaceous microstructures exhibiting high mechanical strength and densities less than 15 lbs/ft$^3$ ($\approx 0.23$ gm/cm$^3$). The bodies consist essentially of an ion exchange product of a large donor cation and a synthetic lithium and/or sodium water-swelling mica. Such bodies are prepared by:

(a) forming a crystal-containing gel from a synthetic lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluoroplylithionite, phlogopite, and fluorphlogopite, the gel containing about 2.5–25%;

(b) subjecting the gel to high shear blending action;

(c) adding a surfactant in an amount of about 0.1–2% by weight to cause bubble formation leading to the development of a froth as the gel as sheared;

(d) while blending, adding a source of an exchangeable large cation as an ion donor to cause an ion exchange reaction to take place between the large cations of said donor and the lithium and/or sodium ions of said lithium and/or sodium water-swelling mica, thereby producing a frothed gel containing ion-exchanged mica crystals;

(e) delivering said frothed, ion-exchanged gel from the blender to form a body of desired configuration;

(f) allowing the ion exchange to proceed to essential completion, thereby thickening and setting the gel to a solid body; and then (g) drying said body.

A lithium fluorhectorite foam body having a thickness of about 19 mm, a density of about 0.096 g/cm$^3$, and exhibiting a modulus or rupture of about 60 psi was prepared in accordance with U.S. Pat. No. 4,442,175, generally in the manner and of the composition of Example 9 of that patent.

(The lithium fluorhectorite had an approximate composition, in weight percent, of 64.5% $SiO_2$, 10.8% MgO, 8.0% $Li_2O$, and 16.7% $MgF_2$.)

A slip for spraying was prepared by suspending a frit of a thermally devitrifiable, zinc borosilicate-type solder glass in a vehicle consisting of pine screen oil and isopropanol. A particularly useful glass consists essentially, by weight, of about 62.5% ZnO, 2.5% MgO, 22.5% $B_2O_3$, and 12.5% $SiO_2$ having a coefficient of thermal expansion of about $42 \times 10^{-7}/°C$. The top and bottom surfaces of the foam body were coated with the frit and the coated body was fired for one hour in air at 750° C. This firing appears to densify the surface of the core body, thereby providing a stronger surface for subsequently bonding the skin members thereto.

Two skin or face sheet members were prepared from four plies of SiC fiber reinforced Corning Code 1723 glass, the fiber content comprising about 50% by volume. The four plies were stacked in alternating symmetrical 0° and 90° orientations to yield a laminate of about 1 mm thickness.

Additional slip was sprayed onto the surface of each face sheet member to be joined to the foam core member. [This frit was chosen because of its close match in thermal expansion to that of the SiC fiber reinforced Corning Code 1723 glass, and because its sintering temperature is below the recrystallization temperature of the foam core ($\approx 850°$ C.).]

The laminates were then applied to the top and bottom surfaces of the core member and the resulting sandwich was transferred to an electrically-heated furnace. The temperature of the furnace was raised at about 300° C./hour to 750° C., that temperature was maintained for about one hour, and then the sandwich was cooled to ambient temperature at approximately 200° C./hour.

The face sheets were well bonded to the foam core, and, when the sandwich was broken, the failure was in the foam body, thereby indicating that the frit bond was stronger than the core.

This type of composite structure recommends itself for applications where very low weight and/or low thermal conductivity is desired and use temperatures up to 700° C. are contemplated. The face sheets are extraordinarily strong and the foam core exhibits inherent toughness due to its micaceous microstructure.

Another particularly useful type of cellular bodies is disclosed in U.S. Pat. No. 4,112,032. That patent described the preparation of amorphous, porous silica-containing articles having pore diameters ranging between about 100 Å–1 micron, wherein at least 80% of the pores therein fall within ±30% of the average pore diameter. The articles are produced through gelation of aqueous alkali metal silicate and/or colloidal silica solutions, optionally containing dispersed particulate phases, with organic reagents followed by a leaching step. Uniformity of pore size is achieved through careful control of such variables as the ratio of alkali metal silicate to colloidal silica solutions, the concentration of silica, the amount of dispersed phase employed, and the like.

An amorphous, porous potassium silicate body having a thickness of about 10 mm, an average pore diameter of about 1800 Å, a density of about 0.35 g/cm$^3$, and exhibiting a modulus of rupture of about 100 psi was prepared generally in the manner and of the composition of Example 6 of U.S. Pat. No. 4,112,032. (The base composition therefor consisted essentialy, in weight percent, of 90% potassium silicate solution, 10% colloidal silica solution.)

A paste was prepared by suspending frit of a thermally devitrifiable solder glass of the type disclosed in U.S. Pat. No. 3,488,216 in a vehicle consisting of pine screen oil. The crystal phase developed is a lead titanate. One particularly useful glass of this type consists essentially, in weight percent, of bout 65% PbO, 1% $Al_2O_3$, 2% $B_2O_3$, 16% $SiO_2$, and 16% $TiO_2$, and having a coefficient of thermal expansion of about $5 \times 10^{-7}/°C$ Two skins or face sheet members were prepared from four plies of a graphite fiber reinforced borosilicate glass, marketed by Corning Glass Works under the PYREX® trademark, the fiber content constituting about 55% by volume. The four plies were stacked in alternating symmetrical 0° and 90° orientations to produce a laminate of about 1.9 mm thickness. Corning Code 7740 is an example of a glass marketed under the PYREX® trademark which consists essentially in weight percent, of about 2% $Al_2O_3$, 4% $Na_2O$, 13% $B_2O_3$, and 81% $SiO_2$, and exhibits a coefficient of thermal expansion (0°–300° C.) of about $32.5 \times 10^{-7}/°C$.

The frit paste was applied with a spatula to the surface of each face sheet member to be bonded to the porous core member. [This frit was chosen because of its close match in thermal expansion to that of the graphite fiber reinforced borosilicate glass, and because its sintering temperature is below the softening point of the borosilicate glass.]

The skin laminates were thereafter applied to the top and bottom surfaces of the core member and the resulting sandwich was introduced into an electrically-heated furnace. The temperature of the furnace was raised at about 400° C./hour to 750° C., that temperature was maintained for about 30 minutes, and the sandwich then cooled to room temperature at about 300° C./hour.

The skins were well bonded to the porous core member, and, when the sandwich was broken, the failure occurred in the porous body, thereby indicating that the frit bond was stronger than the core.

This type of composite structure is especially useful in applications where very low weight and low thermal expansion are desired at use temperatures up to $\approx 500°$ C. These structures recommend themselves as support elements for lightweight space mirrors and structural sheathing for space vehicles.

It will be appreciated, of course, that, where desired, the core member may be reinforced through the presence of ceramic fibers and/or whiskers.

We claim:

1. A laminated structure consisting essentially of:
   (a) a light weight interior member selected from the group consisting of a corrugated body and a honeycomb body composed of a glass-ceramic or a ceramic;
   (b) an exterior member composed of a glass-ceramic or a ceramic; and
   (c) a bonding member for joining together said interior member and said exterior member composed of a high temperature glass-ceramic prepared from a thermally crystallizable glass; wherein the coefficients of thermal expansion of said interior member, said exterior member, and said bonding member are closely compatible, and the temperature interval $T_g - T_{Cryst}$ of said bonding member is about 100°–150° C.

2. A laminated structure according to claim 1, wherein at least one of said interior member, exterior member, and bonding member is reinforced through the entrainment of ceramic fibers and/or whiskers.

3. A laminated structure according to claim 1, wherein said bonding member contains ceramic particles.

4. A laminated structure according to claim 1, wherein each of said interior member, said exterior member, and said bonding member consists of a glass-ceramic having approximately the same composition.

5. A laminated structure according to claim 1, wherein each of said interior and exterior members is reinforced through the entrainment of ceramic fibers and/or whiskers and said bonding member is reinforced through the entrainment of ceramic whiskers.

6. A laminated structure consisting essentially of:
   (a) a light weight interior member consisting of a porous body composed of a ceramic foam having a micaceous microstructure;
   (b) an exterior member composed of an alkaline earth aluminosilicate glass; and
   (c) a bonding member for joining together said interior member and said exterior member composed of a zinc borosilicate-type solder glass;
wherein the coefficients of thermal expansion of said interior member, said exterior member, and said bonding member are closely compatible.

7. A laminated structure according to claim 6 wherein at least one of said exterior member and said interior member is reinforced through the entrainment of ceramic fibers and/or whiskers.

8. A laminated structure according to claim 6 wherein each of said exterior and interior members is reinforced through the entrainment of ceramic whiskers and/or fibers, and said bonding member is reinforced through the entrainment of ceramic whiskers.

9. A laminated structure consisting essentially of:
   (a) a light weight interior member consisting of an amorphous, porous silica-containing body;
   (b) an exterior member consisting of a borosilicate glass; and
   (c) a bonding member for joining together said interior member and said exterior member consisting of a thermally devitrifiable solder glass wherein the crystal phase developed is a lead titanate;
wherein the coefficients of thermal expansion of said interior member, said exterior member, and said bonding member are closely compatible.

10. A laminted structure according to claim 9 wherein at least one of said exterior and interior members is reinforced through the entrainment of ceramic fibers and/or whiskers.

11. A laminated structure according to claim 9 wherein each of said exterior and interior members is reinforced through the entrainment of ceramic whickers and/or fibers, and said bonding member is reinforced through the entrainment of ceramic whiskers.

* * * * *